(12) United States Patent
Nishiguchi

(10) Patent No.: US 11,260,859 B2
(45) Date of Patent: Mar. 1, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventor: Haruhiko Nishiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 668 days.

(21) Appl. No.: 16/108,398

(22) Filed: Aug. 22, 2018

(65) Prior Publication Data

US 2019/0071079 A1 Mar. 7, 2019

(30) Foreign Application Priority Data

Sep. 1, 2017 (JP) .............................. JP2017-168987

(51) Int. Cl.
*B60W 30/12* (2020.01)
*B62D 15/02* (2006.01)
(Continued)

(52) U.S. Cl.
CPC ....... *B60W 30/12* (2013.01); *B60R 21/01538* (2014.10); *B60W 10/20* (2013.01);
(Continued)

(58) Field of Classification Search
CPC ...... B60W 30/12; B60W 10/20; B60W 20/12; B60W 10/06; B60W 10/18;
(Continued)

(56) References Cited

U.S. PATENT DOCUMENTS 9,002,579 B2 * 4/2015 Kataoka ............... B62D 15/025
701/41
9,187,117 B2 * 11/2015 Spero .................... B60W 30/12
(Continued)

FOREIGN PATENT DOCUMENTS

CN 1616289 5/2005
CN 101175662 5/2008
(Continued)

OTHER PUBLICATIONS

Machine translation of WO2017047261, Mar. 23, 2017 (Year: 2017).*
(Continued)

*Primary Examiner* — Jeff A Burke
*Assistant Examiner* — Mohamad O El Sayah
(74) *Attorney, Agent, or Firm* — Amin, Turocy & Watson, LLP

(57) ABSTRACT

A vehicle control system includes a first steering controller that executes first steering control for controlling a steering device such that a traveling lane is maintained, and a second steering controller that executes second steering control that is activated during execution of the first steering control. If a command value given to the steering device in the first steering control has continued to deviate either left or right in a case that the second steering control starts, the second steering controller executes the second steering control by reflecting the command value given in the first steering control.

6 Claims, 13 Drawing Sheets

(51) Int. Cl.
*B60R 21/015* (2006.01)
*B60W 10/20* (2006.01)
*B62D 5/04* (2006.01)
*B62D 6/10* (2006.01)
*B60W 20/12* (2016.01)
*B60W 10/06* (2006.01)
*B60W 10/18* (2012.01)

(52) U.S. Cl.
CPC ............ *B62D 5/0463* (2013.01); *B62D 6/10* (2013.01); *B62D 15/025* (2013.01); *B62D 15/0255* (2013.01); *B60W 10/06* (2013.01); *B60W 10/18* (2013.01); *B60W 20/12* (2016.01)

(58) Field of Classification Search
CPC .. B60R 21/01538; B62D 5/0463; B62D 6/10; B62D 15/025; B62D 15/0255
See application file for complete search history.

(56) References Cited

U.S. PATENT DOCUMENTS

| | | | |
|---|---|---|---|
| 2005/0107931 A1 | 5/2005 | Shimakage et al. | |
| 2009/0222170 A1 | 9/2009 | Scherl et al. | |
| 2018/0009437 A1* | 1/2018 | Ooba | B60W 30/12 |

FOREIGN PATENT DOCUMENTS

| | | |
|---|---|---|
| CN | 103112452 | 5/2013 |
| CN | 103625474 | 3/2014 |
| DE | 102008033432 | 1/2010 |
| DE | 102015015410 | 12/2016 |
| JP | 09-301210 | 11/1997 |
| JP | 2005-162014 | 6/2005 |
| JP | 2014-133477 | 7/2014 |
| JP | 2017/047261 | 3/2017 |
| JP | 2017-124744 | 7/2017 |

OTHER PUBLICATIONS

Japanese Notice of Allowance for Japanese Patent Application No. 2017-168987 dated Feb. 26, 2019.

Chinese Office Action for Chinese Patent Application No. 201810951479.5 dated Apr. 6, 2021.

* cited by examiner

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2017-168987, filed Sep. 1, 2017, the content of which is incorporated herein by reference.

BACKGROUND OF THE INVENTION

Field of the Invention

The present invention relates to a vehicle control system, a vehicle control method, and a storage medium.

Description of Related Art

A technology for supporting automatic lane change of a vehicle has been studied (see, for example, Japanese Unexamined Patent Application, First Publication No. 2014-133477). In this technology, the curvature of a lane in which the vehicle travels is recognized, and control is performed to give an offset to the steering of the vehicle according to the recognized curvature of the lane such that the vehicle travels along a target trajectory.

However, the technology of the related art does not take into consideration the external force applied to the vehicle in a case that performing steering control for lane change. Therefore, in the technology of the related art, the influence of the external force may disturb the behavior of the vehicle.

SUMMARY OF THE INVENTION

The present invention has been made in view of the above circumstances and it is an object of the present invention to provide a vehicle control system, a vehicle control method, and a storage medium which can stabilize the behavior of a vehicle in a case that performing steering control for lane change or the like.

(1) A vehicle control system includes a first steering controller configured to execute first steering control for controlling a steering device such that a traveling lane is maintained, and a second steering controller configured to execute second steering control that is activated during execution of the first steering control, wherein the second steering controller is configured to execute, if a command value given to the steering device in the first steering control has continued to deviate either left or right in a case that the second steering control starts, the second steering control by reflecting the command value given in the first steering control.

(2) In the vehicle control system according to aspect (1), the second steering controller is configured to calculate, in a case that executing the second steering control, a correction command value on the basis of the command value given in the first steering control by the first steering controller and to add or subtract the correction command value to or from a command value for executing the second steering control.

(3) In the vehicle control system according to aspect (2), the second steering controller is configured to calculate the correction command value on the basis of a command value that has continued to be given in a case that traveling in a straight lane from among command values given in the first steering control excluding elements due to a curved road or a steering operation of an occupant.

(4) In the vehicle control system according to aspect (2), the second steering controller is configured to set a first target position at which the second steering control ends in a case that executing the second steering control and to set a second target position at which the second steering control ends to a position far from the first target position in a case that the calculated correction command value is equal to or greater than a predetermined threshold value.

(5) In the vehicle control system according to aspect (2), the second steering control of the second steering controller is control of performing lane change of a vehicle.

(6) A vehicle control method performed by a computer mounted in a vehicle includes the computer executing first steering control for controlling a steering device such that a traveling lane is maintained, and executing second steering control that is activated during execution of the first steering control, wherein if a command value given to the steering device in the first steering control has continued to deviate either left or right in a case that the second steering control starts, the second steering control is executed by reflecting the command value given in the first steering control.

(7) A computer-readable non-transitory storage medium storing a program causes a computer to execute first steering control for controlling a steering device such that a traveling lane is maintained and to execute second steering control that is activated during execution of the first steering control, wherein if a command value given to the steering device in the first steering control has continued to deviate either left or right in a case that the second steering control starts, the second steering control is executed by reflecting the command value given in the first steering control.

According to aspect (1), (6) or (7), it is possible to stabilize the behavior of the vehicle in a case that performing the second steering control that can be activated during execution of the first steering control.

According to aspect (2), it is possible to calculate the correction command value from the command value of the first steering control which has been executed before the second steering control and thus to stabilize the behavior of the vehicle in the second steering control in a state where an external force is applied to the vehicle.

According to aspect (3), it is possible to extract a specific value of the correction command value by excluding elements other than those of the external force applied to the vehicle in a case that calculating the correction command value.

According to aspect (4), by extending a distance over which the second steering control is performed, it is possible to further stabilize the behavior of the vehicle by the second steering control in a case that the influence of the external force is great.

According to aspect (5), it is possible to stably perform lane change of the vehicle.

DETAILED DESCRIPTION OF THE INVENTION

First Embodiment

[Overall Configuration]

Figure 1:
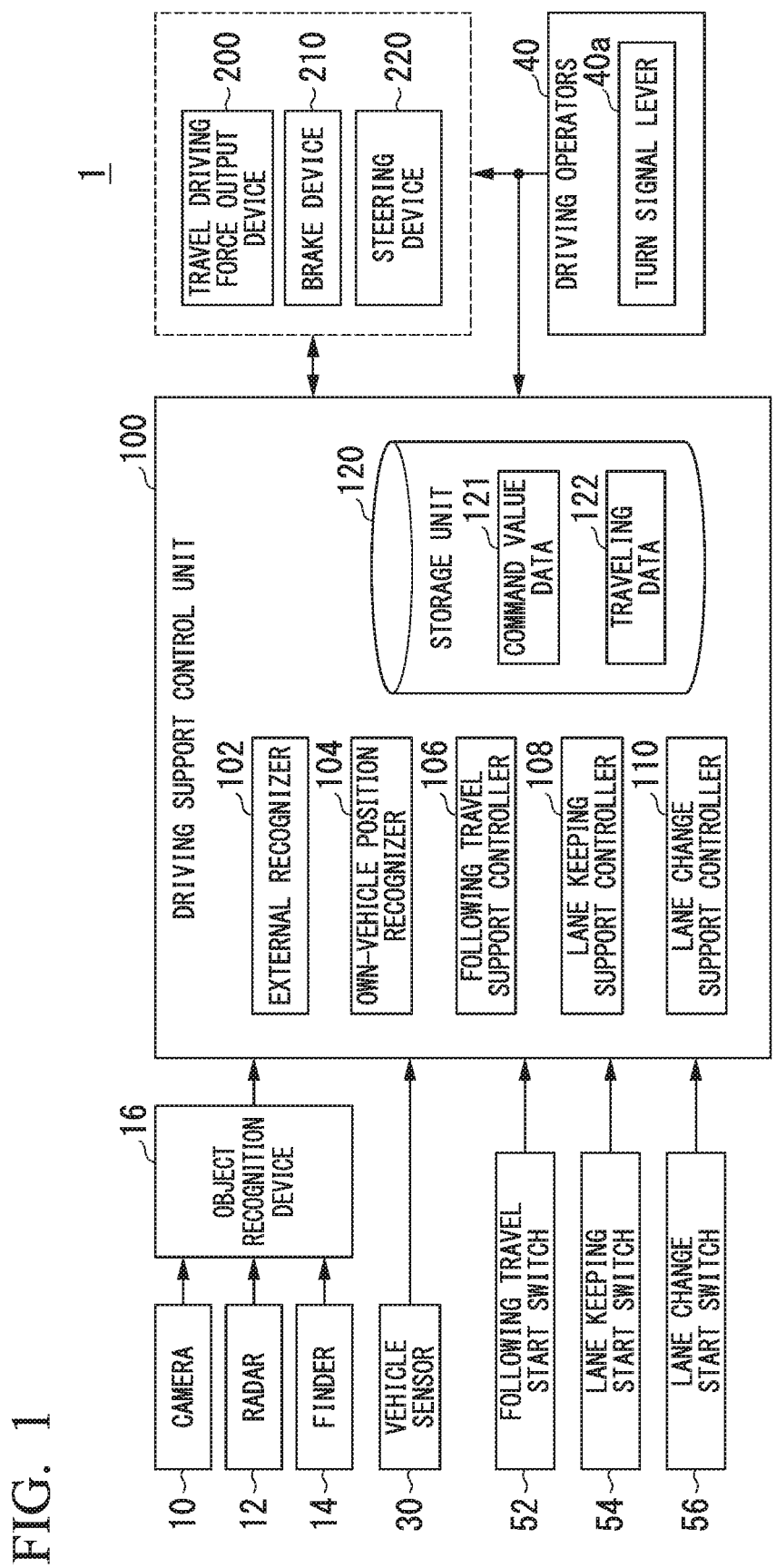
FIG. 1 is a diagram showing an exemplary configuration of a vehicle control system according to a first embodiment.

FIG. 1 is a diagram showing an exemplary configuration of a vehicle control system 1 of a first embodiment. A vehicle in which the vehicle control system 1 is mounted (hereinafter referred to as an own-vehicle M) is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle control system 1 includes, for example, a camera 10, a radar 12, a finder 14, an object recognition device 16, vehicle sensors 30, driving operators 40, a following travel start switch 52, a lane keeping start switch 54, a lane change start switch 56, a driving support control unit 100, a travel driving force output device 200, a brake device 210, and a steering device 220. These devices or apparatuses are connected to each other by a multiplex communication line or a serial communication line such as a controller area network (CAN) communication line, a wireless communication network, or the like. Control amounts or output values of these devices or apparatuses are appropriately stored in the storage unit 120 as traveling data 122. The components shown in FIG. 1 are merely an example and some of the components may be omitted or other components may be added.

The camera 10 is, for example, a digital camera using a solid-state imaging device such as a charge coupled device (CCD) or complementary metal oxide semiconductor (CMOS) image sensor. One or a plurality of cameras 10 may be attached to arbitrary locations of the own-vehicle M. For imaging the area in front of the vehicle, a camera 10 is attached to an upper portion of a front windshield, a rear surface of a rearview mirror, or the like. For example, the camera 10 repeats imaging of the surroundings of the own-vehicle M at regular intervals. The camera 10 may also be a stereo camera.

The radar 12 radiates radio waves such as millimeter waves around the own-vehicle M and detects radio waves reflected by an object (reflected waves) to detect at least the position (distance and orientation) of the object. One or a plurality of radars 12 may be attached to the own-vehicle M at arbitrary locations. The radar 12 may detect the position and velocity of an object using a frequency modulated continuous wave (FM-CW) method.

The finder 14 is a light detection and ranging or laser imaging detection and ranging (LIDAR) finder which measures scattered light from an object in response to illuminated light to detect the distance to the object. One or a plurality of finders 14 may be attached to the own-vehicle M at arbitrary locations.

The object recognition device 16 performs a sensor fusion process on results of detection by some or all of the camera 10, the radar 12, and the finder 14 to recognize the position, type, velocity, moving direction, or the like of the object. Objects for recognition are, for example, any types of objects such as a vehicle, a guardrail, a utility pole, a pedestrian, and a road sign. The object recognition device 16 outputs the recognition result to the driving support control unit 100. The object recognition device 16 may output a part of information input from the camera 10, the radar 12, or the finder 14 to the driving support control unit 100 as it is.

The vehicle sensors 30 include, for example, a vehicle speed sensor that detects the speed of the own-vehicle M, an acceleration sensor that detects the acceleration thereof, a yaw rate sensor that detects an angular speed thereof about the vertical axis, an orientation sensor that detects the orientation of the own-vehicle M, or the like. Each of the sensors included in the vehicle sensors 30 outputs a detection signal indicating the detection result to the driving support control unit 100. The output from each sensor is stored in the storage unit 120 as traveling data 122.

The driving operators 40 include, for example, various operators such as the steering wheel described above, a turn signal lever 40a for operating a turn signal indicator (a direction indicator), an accelerator pedal, a brake pedal, and a shift lever. For example, an operation detector that detects the amount of an operation performed by an occupant is attached to each of the driving operators 40. The operation detectors detect the position of the turn signal lever 40a, the amount of depression of the accelerator pedal or the brake pedal, the position of the shift lever, the steering angle or steering torque of the steering wheel, or the like. Then, each of the operation detectors outputs a detection signal indicating the detection result to either or both of the driving support control unit 100 or the travel driving force output, brake, and steering devices 200, 210, and 220.

The following travel start switch 52 is a switch for starting following travel support control by an occupant's operation. The lane keeping start switch 54 is a switch for starting lane keeping support control by the occupant's operation. The lane change start switch 56 is a switch for starting lane change support control by the occupant's operation.

The travel driving force output device 200, the brake device 210, and the steering device 220 will be described below before the description of the driving support control unit 100. The travel driving force output device 200 outputs a travel driving force (torque) required for the own-vehicle M to travel to driving wheels. The travel driving force output device 200 includes, for example, a combination of an internal combustion engine, an electric motor, a transmission, and the like and a power electronic control unit (ECU) that controls them. The power ECU controls the above components according to information input from the driving support control unit 100 or information input from the driving operators 40.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the driving support control unit 100 or information input from the driving operators 40 such that a brake torque corresponding to a braking operation is output to each wheel. The brake device 210 may include, as a backup, a mechanism for transferring a hydraulic pressure generated by an operation of the brake pedal included in the driving operators 40 to the cylinder via a master cylinder. The brake device 210 is not limited to that configured as described above and may be an electronically controlled hydraulic brake device that controls an actuator according to information input from the driving support control unit 100 and transmits the hydraulic pressure of the master cylinder to the cylinder.

The steering device 220 includes, for example, a steering ECU and an electric motor. The electric motor, for example, applies a force to a rack-and-pinion mechanism to change the direction of steering wheels. The steering ECU drives the electric motor according to information input from the driving support control unit 100 or information input from the driving operators 40 to change the direction of the steering wheels.

[Configuration of Driving Support Control Unit]

For example, the driving support control unit 100 includes an external environment recognizer 102, an own-vehicle position recognizer 104, a following travel support controller 106, a lane keeping support controller 108, a lane change support controller 110, and the storage unit 120. The lane keeping support controller 108 is an example of the "first steering controller," and the lane change support controller 110 is an example of the "second steering controller."

Each of these components of the driving support control unit 100 is realized, for example, by a hardware processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU) or may be realized by cooperation of hardware and software.

The storage unit 120 is realized by a hard disk drive (HDD), a flash memory, a random access memory (RAM), a read only memory (ROM), or the like.

The external environment recognizer 102 recognizes states of a nearby vehicle(s) such as the position, speed and acceleration thereof on the basis of information input from the camera 10, the radar 12, and the finder 14 via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes). The external environment recognizer 102 may also recognize the states of other types of objects such as guardrails, utility poles, parked vehicles, or pedestrians in addition to nearby vehicles.

On the basis of an image captured by the camera 10, the external environment recognizer 102 recognizes a plurality of lanes Lm (m=1, 2, 3 . . . ) on a road R on which the own-vehicle M is traveling. In a case that recognizing the lanes, the external environment recognizer 102 recognizes lane markers LMm on a road surface of the road R. The lane markers LMm include, for example, poles, Botts' dots, chatter bars, cat eyes, guardrails, separation lines, color-coded lanes, or the like in addition to yellow lines and white lines drawn on a road to distinguish lanes on the road. The external environment recognizer 102 recognizes a plurality of lanes Lm on the road R on the basis of the recognized lane markers LMm.

For example, the own-vehicle position recognizer 104 recognizes a lane in which the own-vehicle M is traveling (a traveling lane) and the relative position and attitude of the own-vehicle M with respect to the traveling lane on the basis of two lane markers LMm nearest to the own-vehicle M among the lane markers LMm recognized by the external environment recognizer 102.

Figure 2:
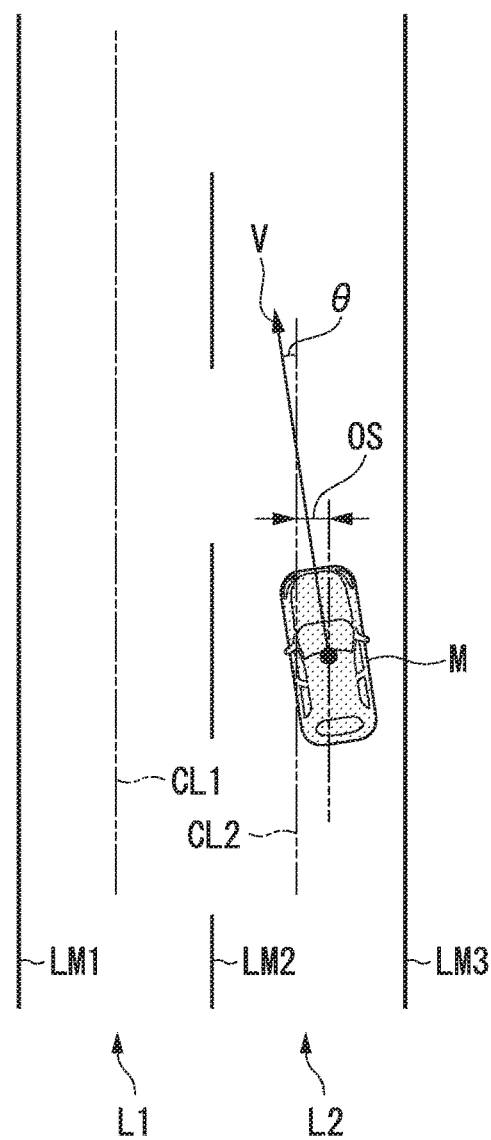
FIG. 2 is a diagram showing a state where an own-vehicle position recognizer recognizes a relative position and attitude of an own-vehicle M with respect to a lane.

FIG. 2 is a diagram showing a state where the own-vehicle position recognizer 104 recognizes the relative position and attitude of the own-vehicle M with respect to the lane L2. For example, on the basis of lane markers LM1 to LM3 recognized by the external environment recognizer 102, the own-vehicle position recognizer 104 recognizes a region between the two lane markers LM2 and LM3 nearest to the own-vehicle M as a lane L2 in which the own-vehicle M is traveling.

The own-vehicle position recognizer 104 sets a virtual center line between the lane markers LM1 and LM2 as a traveling lane center CL1 and sets a virtual center line between the lane markers LM2 and LM3 as a traveling lane center CL2. Hereinafter, the traveling lane centers CL1 and CL2 will sometimes be collectively referred to as traveling lane centers CL. Then, the own-vehicle position recognizer 104 sets a distance OS at which a reference point (for example, the center of gravity) of the own-vehicle M deviates from the position of the traveling lane center CL and derives the relative position of the own-vehicle M in the lane L2 on the basis of the distance OS.

Alternatively, the own-vehicle position recognizer 104 may derive the position of the reference point of the own-vehicle M with respect to the lane marker LM1 or LM2 or the like as the relative position of the own-vehicle M with respect to the traveling lane.

The own-vehicle position recognizer 104 derives an angle θ formed by the yaw-angle reference direction V of the own-vehicle M with respect to the extending direction of the lane markers LMm or the traveling lane center CL. The own-vehicle position recognizer 104 derives, for example, an angle formed between the yaw-angle reference direction V and the traveling lane center CL as the angle θ. The yaw-angle reference direction V may be the direction of the longitudinal axis of the vehicle or may be a direction in which the center of gravity changes in position at that moment. Other similar directions may also be used.

The following travel support controller 106 performs, for example, control for following a nearby vehicle recognized by the external environment recognizer 102 which is traveling ahead of the own-vehicle M in the traveling direction of the own-vehicle M. The following travel support controller 106 starts following travel support control, for example, with an operation performed on the following travel start switch 52 (an operation performed by the occupant to indicate execution of following travel support control) as a trigger. For example, the following travel support controller 106 controls the travel driving force output device 200 and the brake device 210 to control the speed of the own-vehicle M such that the own-vehicle M follows a nearby vehicle (hereinafter referred to as a "preceding vehicle") which is present within a predetermined distance (for example, about 50 m) forward from the own-vehicle M among nearby vehicles recognized by the external environment recognizer 102. Here, the following travel support controller 106 may set an upper limit and a lower limit to the speed of the own-vehicle M.

"Following" means, for example, traveling while keeping the relative distance between the own-vehicle M and the preceding vehicle (the inter-vehicle distance) constant. Hereinafter, driving support control for supporting traveling of the own-vehicle M in this mode will be referred to as "following travel support control." The following travel support controller 106 may cause the own-vehicle M to travel merely at a set vehicle speed in a case that no preceding vehicles are recognized by the external environment recognizer 102.

The lane keeping support controller 108 performs lane keeping support control (first steering control) for controlling the steering device 220 such that the own-vehicle M can travel while keeping its traveling lane on the basis of the position of the own-vehicle M recognized by the own-vehicle position recognizer 104. The lane keeping support controller 108 gives, for example, a steering command value to the steering device 220 to control the amount of steering. For example, the lane keeping support controller 108 causes the own-vehicle M to travel along the traveling lane center CL1 while traveling in the lane L1.

The lane keeping support controller 108 starts lane keeping support control, for example, with an operation performed on the lane keeping start switch 54 by the occupant (an operation performed by the occupant to indicate execution of lane keeping support control) as a trigger. Hereinafter, driving support control for controlling the own-vehicle M such that it travels along the traveling lane center CL will be referred to as "lane keeping support control." The lane keeping support controller 108 performs lane keeping support control, for example, using the traveling lane center CL as a target trajectory.

For example, the lane change support controller 110 automatically controls lane change of the own-vehicle M. The lane change support controller 110 may be activated during execution of the lane keeping support control. For example, the lane change support controller 110 controls the travel driving force output device 200, the brake device 210, and the steering device 220 to cause the own-vehicle M to change lanes to an adjacent lane to which it has been determined that lane change is possible, regardless of the occupant's operation (steering control) of the steering device 220. The control of the lane change support controller 110 is enabled, for example, by operating the lane change start switch 56 in a state where the lane keeping support control is being performed.

The lane change support control starts, for example, with an operation performed on the turn signal lever 40a by the occupant (an operation performed by the occupant to indicate execution of lane change support control) in a state where the lane keeping support control is enabled as a trigger. The lane change support controller 110 may perform the control, for example, in a state where the following travel support control of the following travel support controller 106 and the lane keeping support control of the lane keeping support controller 108 are in operation.

[Vehicle Control Process]

Figure 3:
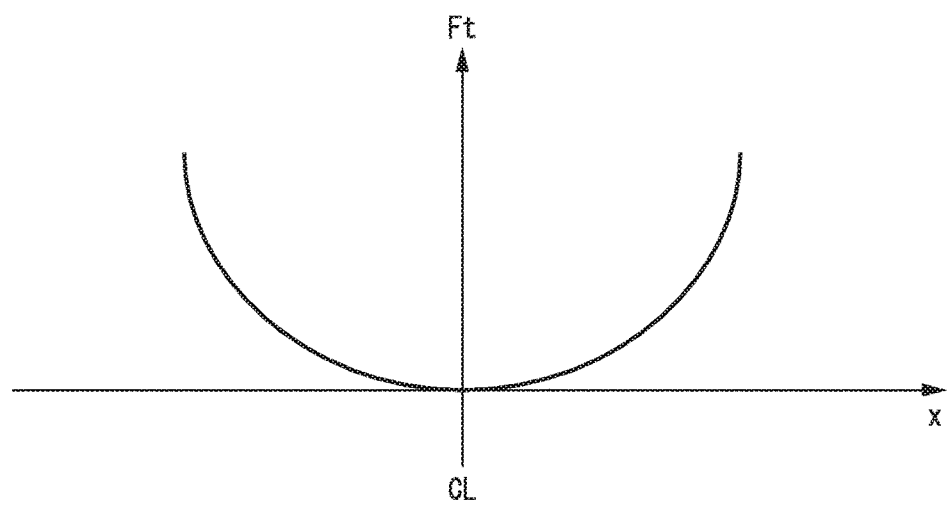
FIG. 3 is a diagram showing an example of a steering command value used for lane keeping support control.

Next, a vehicle control process will be described. For example, the lane keeping support controller 108 controls the steering device 220 and outputs a steering command value Ft which increases for a direction returning to the position of the traveling lane center CL as the deviation of the reference point of the own-vehicle M from the traveling lane center CL increases. FIG. 3 is a diagram showing an example of the steering command value used for the lane keeping support control. The lane keeping support controller 108 controls the steering device 220 by giving the steering command value to the steering device 220.

For example, the steering command value is a torque command value that indicates the torque of steering as a control signal for the steering direction of the steering device 220. Alternatively, the steering command value may be a steering angular speed command value that indicates the steering angular speed of the steering device 220 or a steering angle command value that indicates the steering angle of the steering device 220. In the following description, it is assumed that the steering command value is a torque command value.

The lane keeping support controller 108 determines the steering command value such that the own-vehicle M travels along the traveling lane center CL. Here, in a case that an external force F is applied in a lateral direction to the own-vehicle M, the lateral position of the own-vehicle M deviates in the direction in which the external force F is applied if a steering command value for a state where no external force F is applied is given by the lane keeping support controller 108. The external force F is generated, for example, by wind blowing from the left or right of the own-vehicle M or by the gradient such as the cant in the width direction of the lane Lm.

Figure 4:
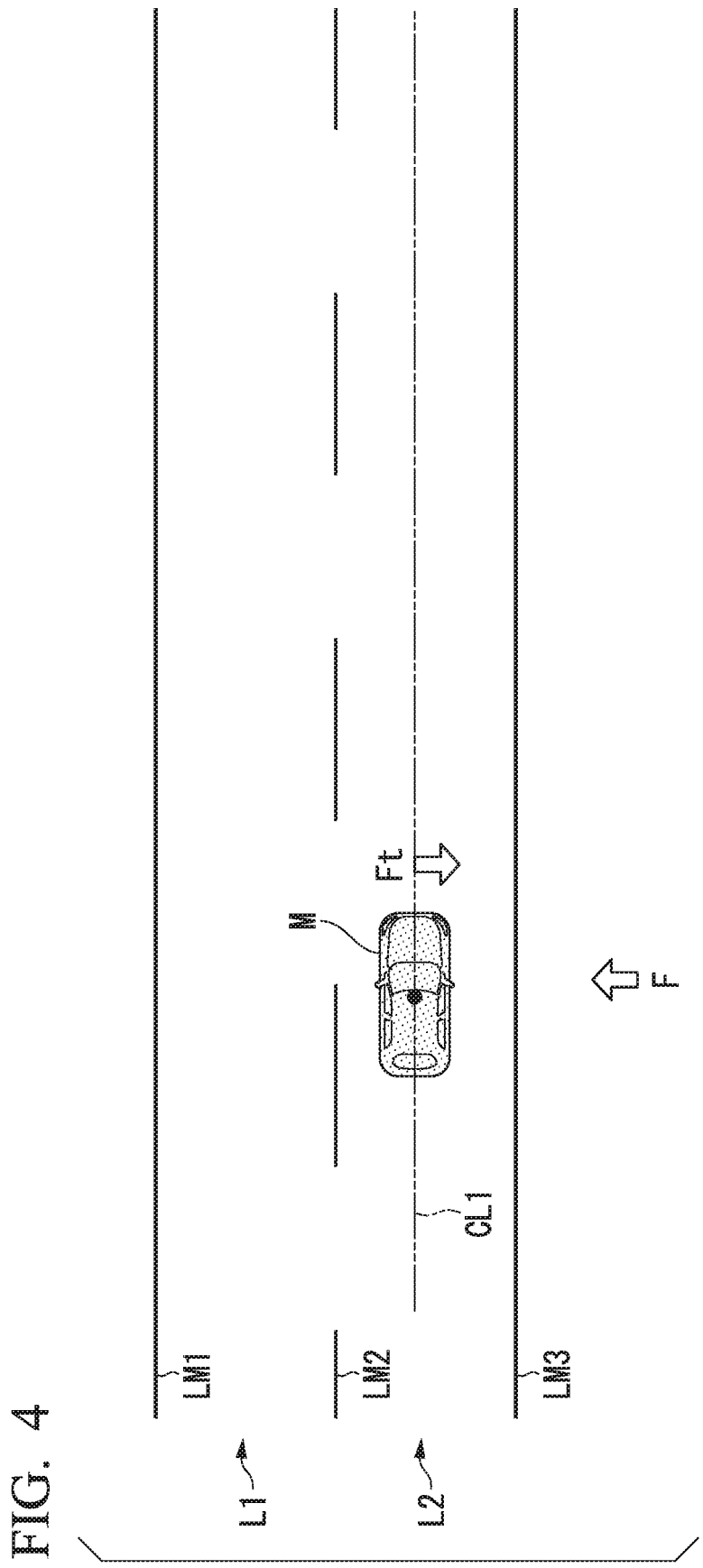
FIG. 4 is a diagram exemplifying a steering command value that is output in a state where an external force is applied in a lateral direction.

FIG. 4 is a diagram exemplifying the steering command value Ft that is output in a state where an external force F is applied in the lateral direction. In a case that the external force F continues to act on the own-vehicle M, the lane keeping support controller 108 continues to output a steering torque Ft to resist the external force. The lane change support controller 110 stores the steering command value Ft used for the lane keeping support control in the storage unit 120 as command value data 121.

Figure 5:
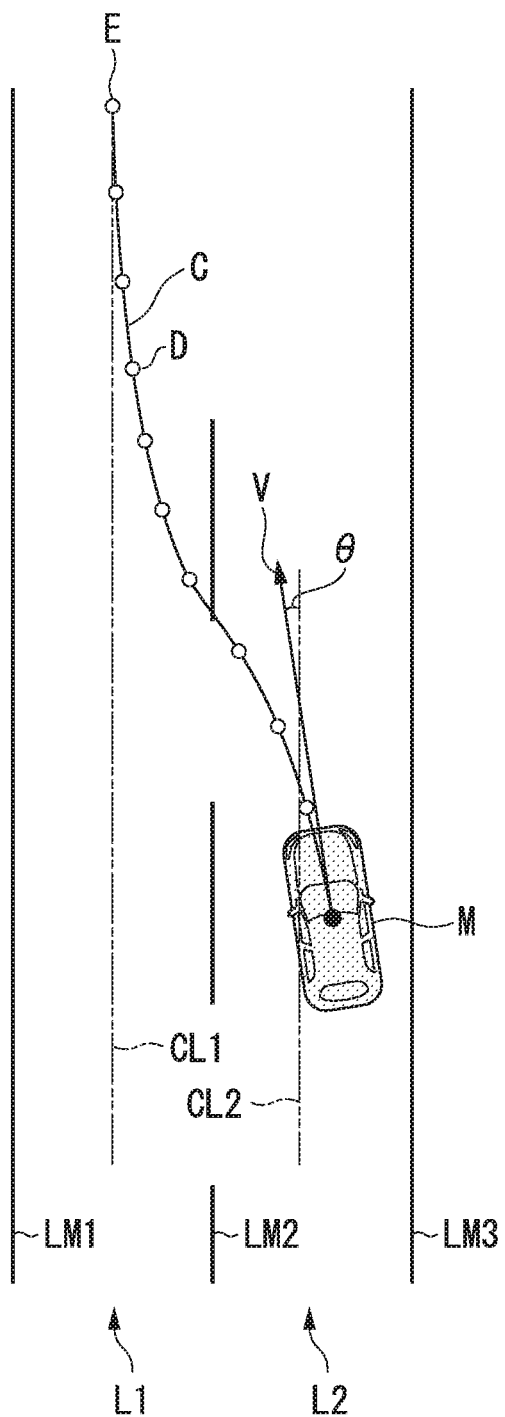
FIG. 5 is a diagram exemplifying the content of processing of a lane change support controller.

While the lane keeping support control is being performed, the lane change support control may be activated by the occupant operating the turn signal lever 40a. FIG. 5 is a diagram exemplifying the content of processing of the lane change support controller 110. The lane change support controller 110 generates a trajectory for lane change of the own-vehicle M.

The lane change support controller 110 multiplies the speed of the own-vehicle M by the number of seconds required for lane change to derive a distance required for lane change of the own-vehicle M. The number of seconds required for lane change is set in advance on the premise that the distance of lateral movement and the speed in the lateral direction in a case that lane change is performed are constant values.

The number of seconds required for lane change is set on the basis of the lateral distance traveled at the end of traveling to the target lateral distance, assuming that lane change is performed at an appropriate lateral speed. The lane change support controller 110 sets an end point E of lane change along a traveling lane center CL1 on the lane L1 to which lane change is to be made on the basis of the derived distance required for lane change. The lane change support controller 110 performs lane change support control, for example, with the end point E of lane change as a target position.

For example, on the basis of the current position and yaw-angle reference direction V of the own-vehicle M and the position and yaw-angle reference direction V of the set end point of lane change, the lane change support controller 110 generates a trajectory C for lane change by connecting the two positions smoothly using a polynomial curve such as a spline curve.

The lane change support controller 110 generates, for example, a plurality of trajectory points D along the generated trajectory C at predetermined intervals. The lane change support controller 110 determines a steering support amount (a steering torque) required to cause the own-vehicle M to travel along the generated trajectory points D, for example, on the basis of a relationship between the turning angle and the speed assumed at each of the trajectory points D and outputs the steering support amount to the steering device 220 as feedforward (FF) control. Further, on the basis of the deviation between the trajectory point D and the position of the own-vehicle M, the lane change support controller 110 calculates a steering support amount for reducing the deviation and outputs the steering support amount to the steering device 220 as feedback control.

In this manner, the lane change support controller 110 sets the trajectory C as a target trajectory in the lane change and causes the own-vehicle M to travel such that it sequentially passes through the generated trajectory points D, thus causing the own-vehicle M to perform lane change.

Here, the case in which an external force F continues to be applied to the own-vehicle M as described above will be considered. In this case, execution of the lane change support control without considering the external force F may disturb the behavior of the own-vehicle M.

Figure 6:
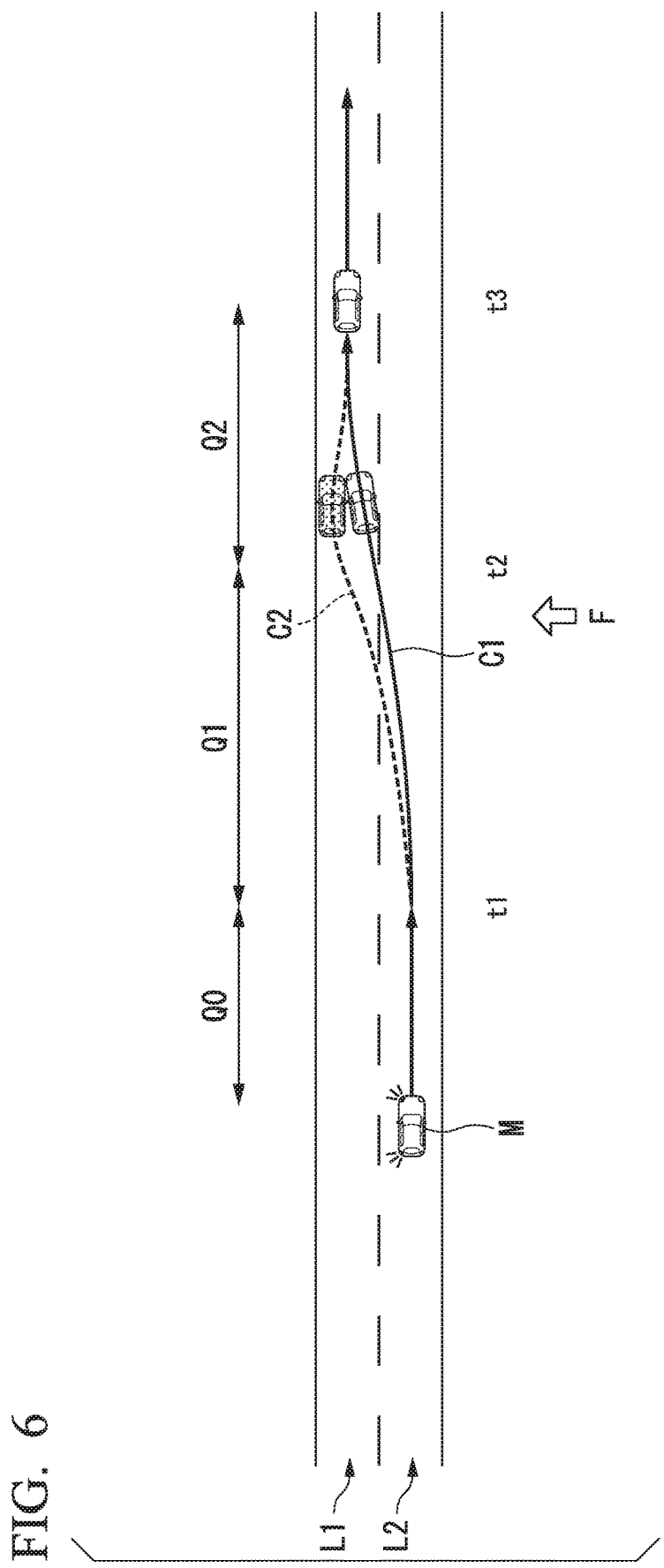
FIG. 6 is a diagram showing an example of a traveling trajectory in a case that lane change is performed in a state where an external force is applied to the own-vehicle M.

FIG. 6 is a diagram showing an example of a traveling trajectory in a case that lane change is performed in a state where an external force F is applied to the own-vehicle M. As shown, in a case that the external force F is applied to the own-vehicle M, the position of the own-vehicle M in the lateral direction deviates from a target trajectory C1 such that it travels along a traveling trajectory C2 with a disturbed behavior of the own-vehicle M. On the other hand, the vehicle control system 1 of the present embodiment prevents this by performing feedforward control in consideration of the influence of external force in the lane change support control.

Figure 7:
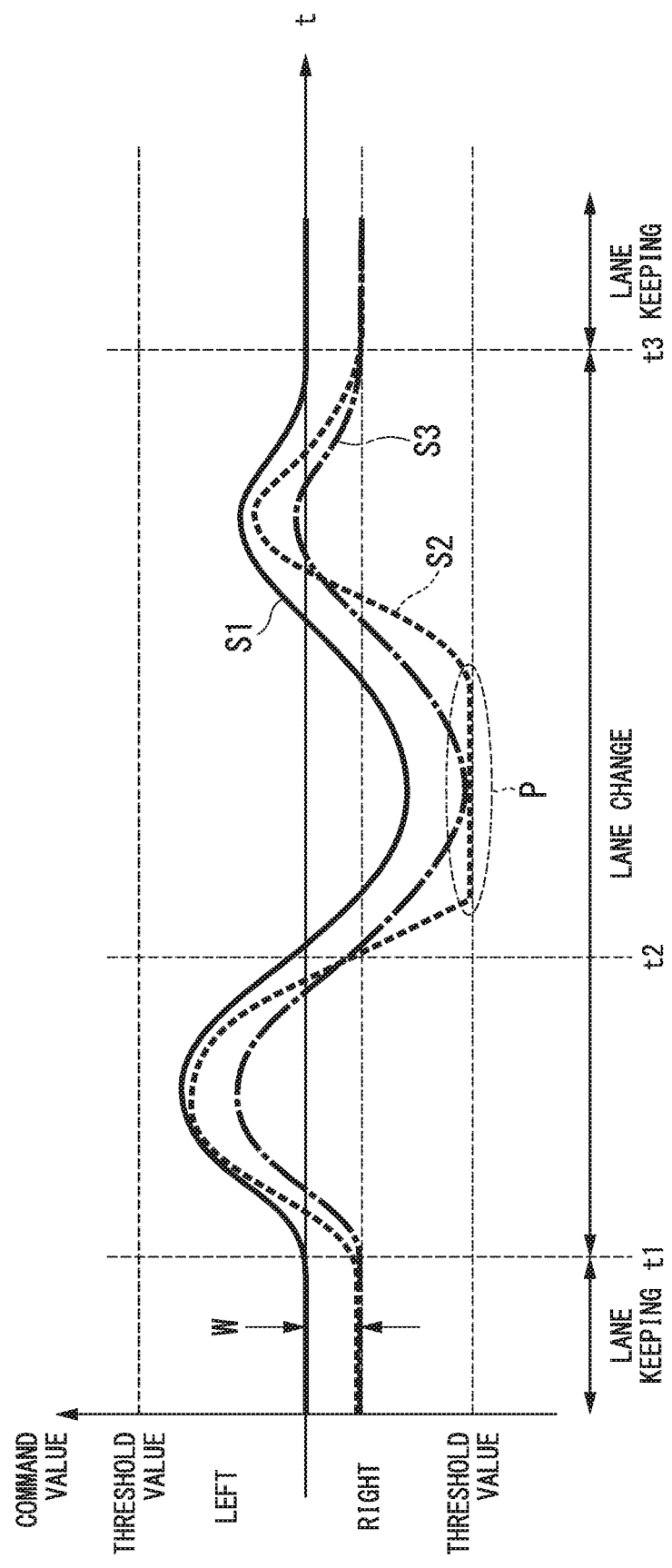
FIG. 7 is a diagram showing an example of processing of lane change support control.

FIG. 7 is a diagram showing an example of processing of the lane change support control. A curve S1 indicates a first steering command value in a state where no external force F is applied to the own-vehicle M. A curve S2 indicates a second steering command value in a case that lane change is performed without considering an external force in a state where the external force F is applied to the own-vehicle M. A curve S3 indicates a third steering command value in a case that lane change is performed in consideration of an external force in advance in a state where the external force F is applied to the own-vehicle M.

As shown, in a case that lane change is performed along the target trajectory C1 in a case that no external force F is applied, the lane change support controller 110 controls the steering device 220 according to the first steering command value.

Here, in a case that normal lane change support control is performed to cause the own-vehicle to travel along the target trajectory C1 in a state where an external force F is applied to the own-vehicle M, the traveling trajectory C2 of the own-vehicle M deviates in the direction in which the external force F is applied in a section Q1. Therefore, for example, in a case that a deviation between the target trajectory C1 and the traveling trajectory C2 is detected at time t2, the lane change support controller 110 controls the steering device 220 according to a second steering command value such that the own-vehicle M returns to the target trajectory C1 in a section Q2.

Here, the lane change support controller 110 outputs a steering command value for increasing the strength of the counter steering by feedback control at the time t2 at which the deviation of the traveling trajectory C2 from the target trajectory C1 is detected. However, if the lane change support controller 110 outputs the steering command value for increasing the strength of the counter steering in a state where the own-vehicle M is propelled by inertia in the same direction as that in which the own-vehicle M deviates from the target trajectory C1 by the external force F, the steering command value may reach a threshold value as shown in a part P of the curve S2. In a case that the steering command value reaches the threshold value, it is not possible to instruct the steering device 220 to perform a sufficient counter steering operation, and the own-vehicle M may overshoot in the direction in which the external force F is applied.

The feedback control for lane change described above is an example. If the lane change support controller 110 performs feedback control on the basis of the positions of a plurality of trajectory points D as described above, it performs feedback control for each of the plurality of trajectory points D in the lane change support control in a case that an external force F is applied, making the traveling trajectory unstable.

Therefore, in a case that starting the lane change support control, the lane change support controller 110 determines whether or not a steering command value given to the steering device 220 in the most recent lane keeping support control has continued to deviate in the same direction (for example, to the left or the right) and the steering command value is equal to or greater than a predetermined value. Next, the lane change support controller 110 determines whether the steering command value given in the most recent lane keeping support control is that for a straight lane or that due to a curved road or the occupant's steering.

For example, the lane change support controller 110 refers to the most recent traveling data 122 for the values of the yaw angular speed of the own-vehicle M, the curvature of the lane estimated by the external environment recognizer 102, and the steering torque of the steering device 220 as operated by the occupant.

The lane change support controller 110 determines whether or not the own-vehicle M has traveled in a straight lane on the basis of the value of each piece of data in the traveling data 122. Upon determining that the own-vehicle M has traveled in a straight lane, the lane change support controller 110 calculates a steering command value which has continued to be given for the same direction for traveling in a straight trajectory as a correction steering command value (a correction command value).

That is, based on the traveling data 122, the lane change support controller 110 calculates a correction steering command value on the basis of a steering command value given in a case that the own-vehicle M has traveled in a straight lane from among steering command values given in lane keeping support control excluding elements due to a curved road or a steering operation of the occupant.

The lane change support controller 110 adds or subtracts the calculated correction steering command value to or from the first steering command value to generate a third steering command value and performs lane change support control.

The lane change support controller 110 calculates, for example, a correction steering command value W given in lane keeping support control before the time t2 at which the lane change support control starts. The lane change support controller 110 reflects the correction steering command value W in the steering command value of the lane change support control to generate a third steering command value. The lane change support controller 110 performs the lane change support control on the basis of the third steering command value.

In the example of FIG. 7, the third steering command value is given a predetermined torque command value for the right in advance and therefore does not reach the threshold value like the second steering command value does. The lane change support controller 110 can cause the own-vehicle M to travel along the target trajectory C1 by performing the lane change support control using the third steering command value.

[Process Flow]

Figure 8:
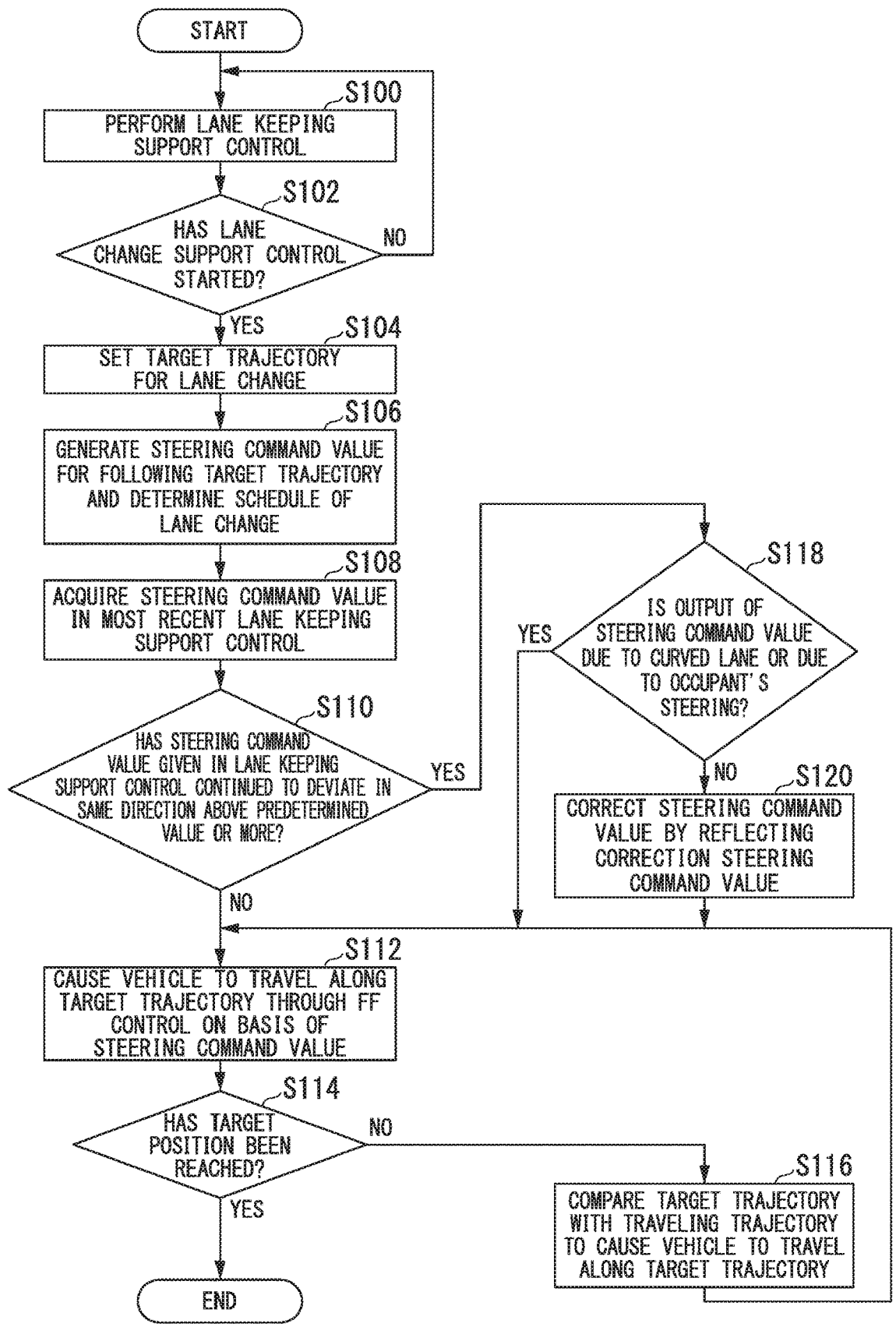
FIG. 8 is a flowchart showing a process flow of a vehicle control system.

Next, a process flow of the vehicle control system 1 will be described. FIG. 8 is a flowchart showing the process flow of the vehicle control system 1.

The lane keeping support controller 108 performs lane keeping support control of the own-vehicle M (step S100). The lane change support controller 110 determines whether or not lane change support control has started with an operation performed on the turn signal lever 40*a* by the occupant as a trigger (step S102). Upon determining that the lane change support control has started, the lane change support controller 110 sets a target position on a lane to which lane change is to be made and sets a target trajectory for lane change (step S104).

The lane change support controller 110 generates a steering command value for following the set target trajectory and determines a schedule of lane change (step S106). The lane change support controller 110 acquires a steering command value given in the most recent lane keeping support control (step S108).

The lane change support controller 110 determines whether or not the steering command value given in the lane keeping support control has continued to be given for the same direction and be equal to or greater than a predetermined value (step S110). In a case that the determination is affirmative in step S110, the lane change support controller 110 determines whether or not the steering command value given in the lane keeping support control is due to a curved road or a steering operation of the occupant (step S118).

In a case that the determination is negative at step S118, the lane change support controller 110 calculates a correction steering command value on the basis of the steering command value that has continued to be given for one direction in a case that traveling in a straight lane and generates a steering command value corresponding to the target trajectory by reflecting the calculated correction steering command value (step S120). In a case that the determination is affirmative in step S118, the lane change support controller 110 proceeds to the processing of step 112.

Next, the lane change support controller 110 causes the own-vehicle M to travel along the target trajectory on the basis of the generated steering command value (step S112).

The lane change support controller 110 determines whether or not the own-vehicle M has reached the target position (step S114). Upon determining that the own-vehicle M has not reached the target position, the lane change support controller 110 compares the target trajectory with the traveling trajectory to cause the own-vehicle M to travel along the target trajectory (step S116). The lane change support controller 110 returns to the processing of step 112 to continue the lane change of the own-vehicle M, and terminates the processing of the flowchart upon determining that the own-vehicle M has reached the target position.

According to the first embodiment described above, the vehicle control system 1 can set a steering command value for lane change by reflecting the influence of an external force applied to the own-vehicle M in a case that lane change is performed. According to the vehicle control system 1, it is possible to perform lane change support control with a stable traveling trajectory by generating a steering command value in consideration of the influence of an external force in advance in the lane change support control.

Second Embodiment

According to the vehicle control system 1 of the first embodiment, the lane change support control is performed by reflecting the correction steering command value W given in the lane keeping support control. In a second embodiment, lane change support control is performed with higher stability.

Figure 9:
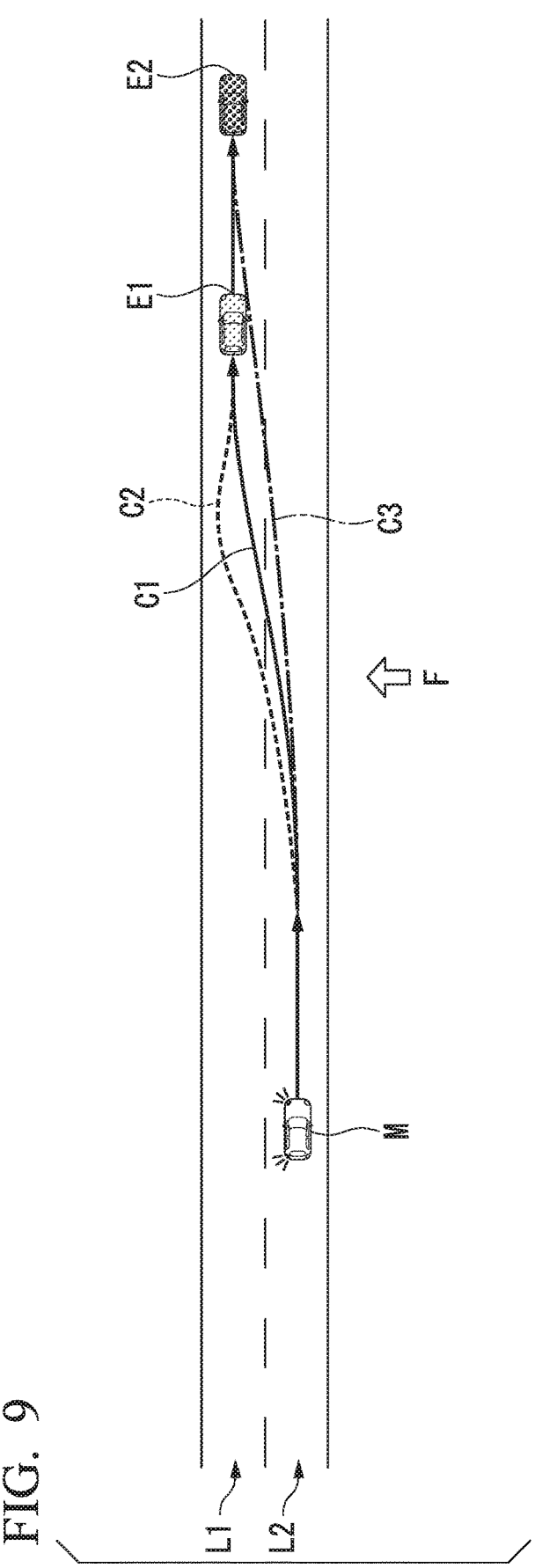
FIG. 9 is a diagram showing an example of a traveling trajectory in a case that lane change is performed in a state where an external force is applied to the own-vehicle M.

FIG. 9 is a view showing an example of a traveling trajectory in a case that lane change is performed in a state where an external force F is applied to the own-vehicle M. For example, in a case that the external force F is strong, it is desirable that a torque command value for counter steering be lowered to stabilize the behavior of the own-vehicle M. In the lane change support control, the lane change support controller 110 changes, for example, the time and distance required for lane change.

For example, the lane change support controller 110 sets a longer target trajectory C3 for lane change than the target trajectory C1 of the first embodiment such that the time required to perform the lane change is longer than the time required to perform lane change in the first embodiment. Thus, the lane change support controller 110 changes the time required to end the lane change in the target trajectory C3 to longer than the time required to end the lane change in the target trajectory C1.

Here, for example, the lane change support controller 110 moves a target position E2 of the target trajectory C3 for lane change in the traveling direction of the own-vehicle M far from the target position E1 of the target trajectory C1 for normal lane change. The lane change support controller 110 generates the target trajectory C3 on the basis of the target position E2. According to the generated target trajectory C3, the lane change support controller 110 gently changes the steering command value such that lane change is performed over a longer time than in a case that lane change is performed according to the target trajectory C1.

Figure 10:
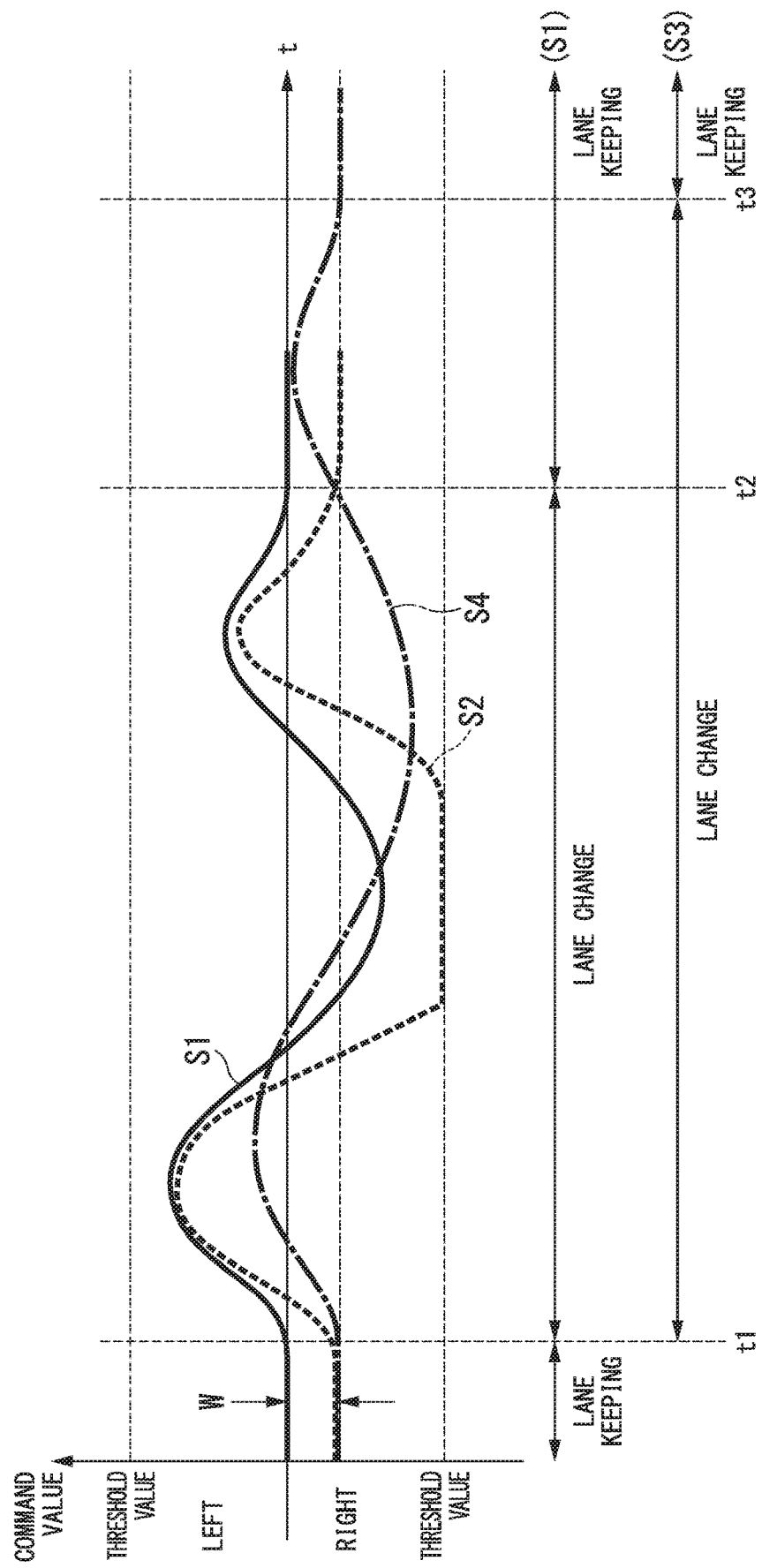
FIG. 10 is a diagram showing an example of processing of lane change support control.

FIG. 10 is a diagram showing an example of processing of the lane change support control. A curve S1 indicates a first steering command value in a state where no external force F is applied to the own-vehicle M. A curve S2 indicates a second steering command value in a case that lane change is performed without considering an external force in a state where the external force F is applied to the own-vehicle M. A curve S4 indicates a fourth steering command value in a case that lane change is performed by considering an external force in advance and setting a longer time during which the control is performed in a state where the external force F is applied to the own-vehicle M.

The lane change support controller 110 sets a steering command value for performing the lane change support control on the basis of a correction steering command value W given in lane keeping support control that has been performed until time t1. Here, the lane change support controller 110 sets the fourth steering command value for ending the lane change at time t3 later than time t2 at which the first steering command value ends the lane change.

A steering operation in the lane change according to the fourth steering command value becomes slower than that of the lane change according to the first steering command value. Therefore, a steering torque applied to oppose the external force F in the lane change according to the fourth steering command value becomes smaller than that of the lane change according to the first steering command value, thereby increasing the robustness of lane change support control in a situation where an external force F is applied to the own-vehicle M.

[Process Flow]

Figure 11:
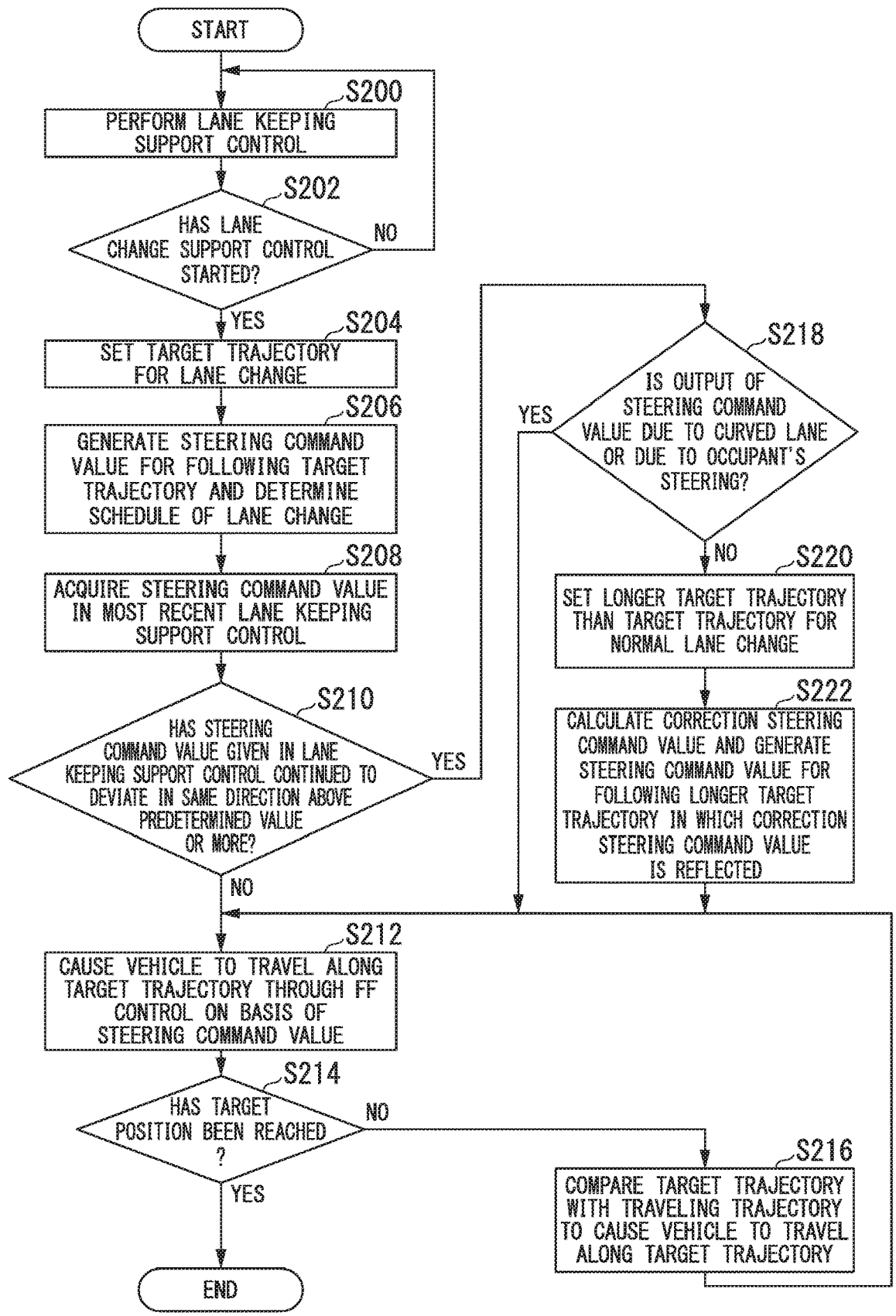
FIG. 11 is a flowchart showing a process flow of a vehicle control system.

Next, a process flow of the vehicle control system 1 of the second embodiment will be described. FIG. 11 is a flowchart showing the process flow of the vehicle control system 1. Steps S200 to S216 are the same as steps S100 to S116 of the first embodiment. Therefore, the processing from step S218 onward will be described.

In a case that the determination is affirmative in step S210, the lane change support controller 110 determines whether or not a steering command value given in the lane keeping support control is due to a curved road or a steering operation of the occupant (step S218).

In a case that the determination is negative in step S218, the lane change support controller 110 sets a longer target trajectory than the target trajectory for normal lane change (step S220). The lane change support controller 110 calculates a correction steering command value on the basis of a steering command value that has continued to be given for one direction in a case that traveling in a straight lane and generates a steering command value corresponding to the longer target trajectory by reflecting the calculated correction steering command value (step S222).

In a case that the determination is affirmative in step S218, the lane change support controller 110 proceeds to the processing of step 212. Next, the lane change support controller 110 proceeds to the processing of step S212 and performs lane change support control (steps S212 to S216).

According to the second embodiment described above, the vehicle control system 1 reflects the influence of an external force applied to the own-vehicle M in a case that performing lane change to set a longer target trajectory than the target trajectory in a case that no external force F is applied, whereby it is possible to perform stable lane change support control.

[Modification 1]

The first and second embodiments described above may be integrated as one vehicle control system 1.

In a case that the influence of the external force F is great in lane change, it is necessary to perform more stable lane change support control. For example, the lane change support controller 110 adjusts the length of the target trajectory for lane change on the basis of the magnitude of the correction steering command value W. For example, in a case that the correction steering command value W is equal to or greater than a predetermined threshold value, the lane change support controller 110 sets a target position at which the lane change ends to a position (a second target position) far from the normal target position in a case that no external force F is applied (a first target position) to set a longer target trajectory than the target trajectory in a case that no external force F is applied.

[Process Flow]

Figure 12:
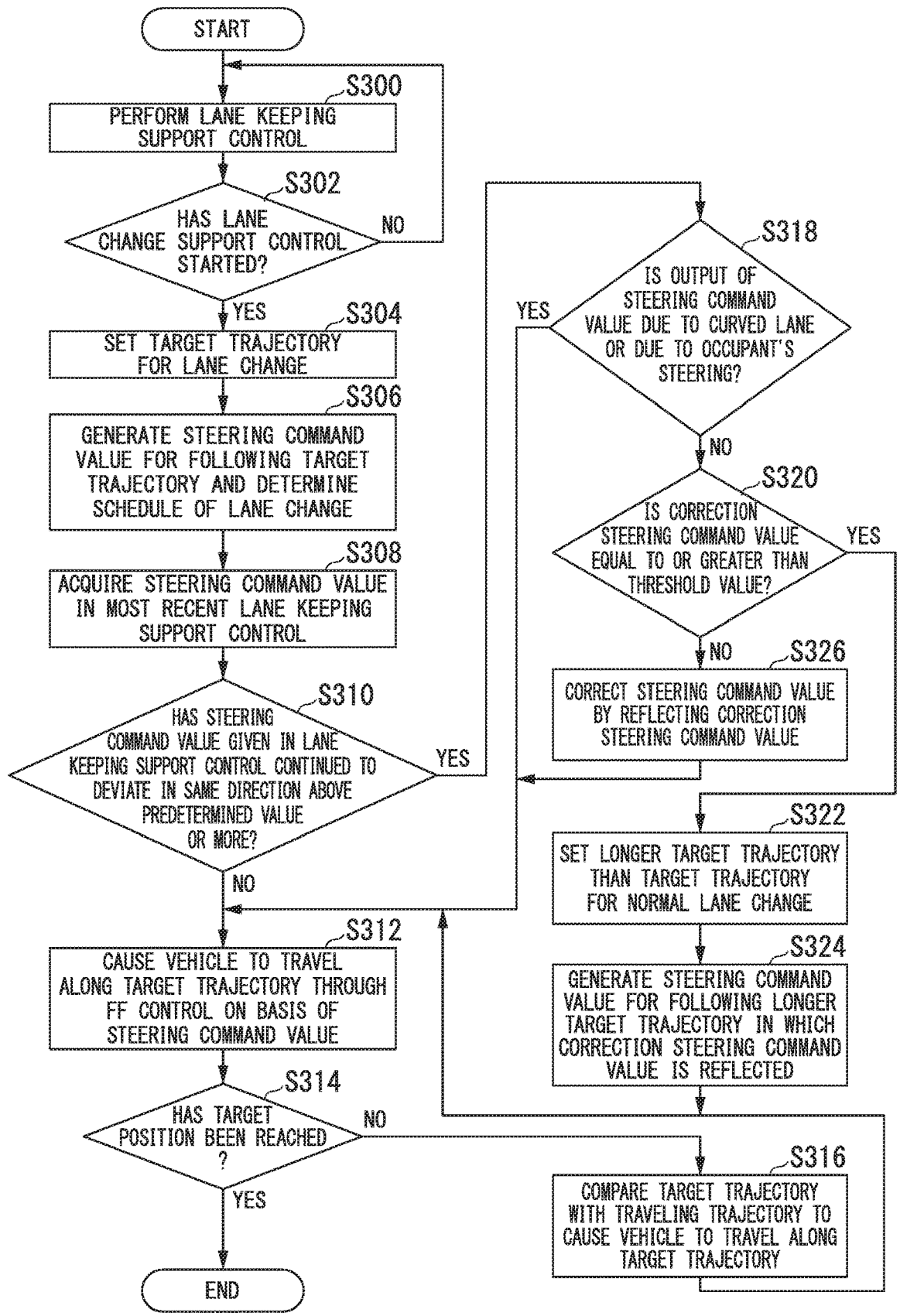
FIG. 12 is a flowchart showing a process flow of a vehicle control system according to a modification.

Next, a process flow of the vehicle control system 1 according to the modification will be described. FIG. 12 is a flowchart showing the process flow of the vehicle control system 1 according to the modification. Steps S300 to S316 are the same as steps S100 to S116 of the first embodiment. Therefore, the processing from step S318 onward will be described.

In a case that the determination is negative in step S310, the lane change support controller 110 determines whether or not the correction steering command value W is equal to or greater than a predetermined threshold value (step S320). Upon determining in step S320 that the correction steering command value W is equal to or greater than the predetermined threshold value, the lane change support controller 110 sets a target position at which the lane change ends to a position far from the target position in a case that no external force F is applied to set a longer target trajectory than the target trajectory in a case that no external force F is applied (step S322). The lane change support controller 110 generates a steering command value for following the longer target trajectory in which the correction steering command value is reflected (step S324).

Upon determining in step S320 that the correction steering command value W is smaller than the predetermined threshold value, the lane change support controller 110 generates a steering command value corresponding to the target trajectory by reflecting the correction steering command value (step S326). Thereafter, the lane change support controller 110 proceeds to the processing of step S312 and performs lane change support control (steps S312 to S316).

The vehicle control system 1 according to the modification described above can select whether or not to set a longer target trajectory than the target trajectory in a case that no external force F is applied on the basis of the magnitude of the external force applied to the own-vehicle M in a case that lane change is performed, whereby it is possible to perform more stable lane change support control. In addition, in the above flowchart, the lane change support controller 110 may omit the determination of step 320 and may set a target position at which the lane change ends to a position far from the target position in a case that no external force F is applied to set a longer target trajectory than the target trajectory in a case that no external force F is applied, regardless of whether or not the correction steering command value W is equal to or greater than the predetermined threshold value.

[Modification 2]

Figure 13:
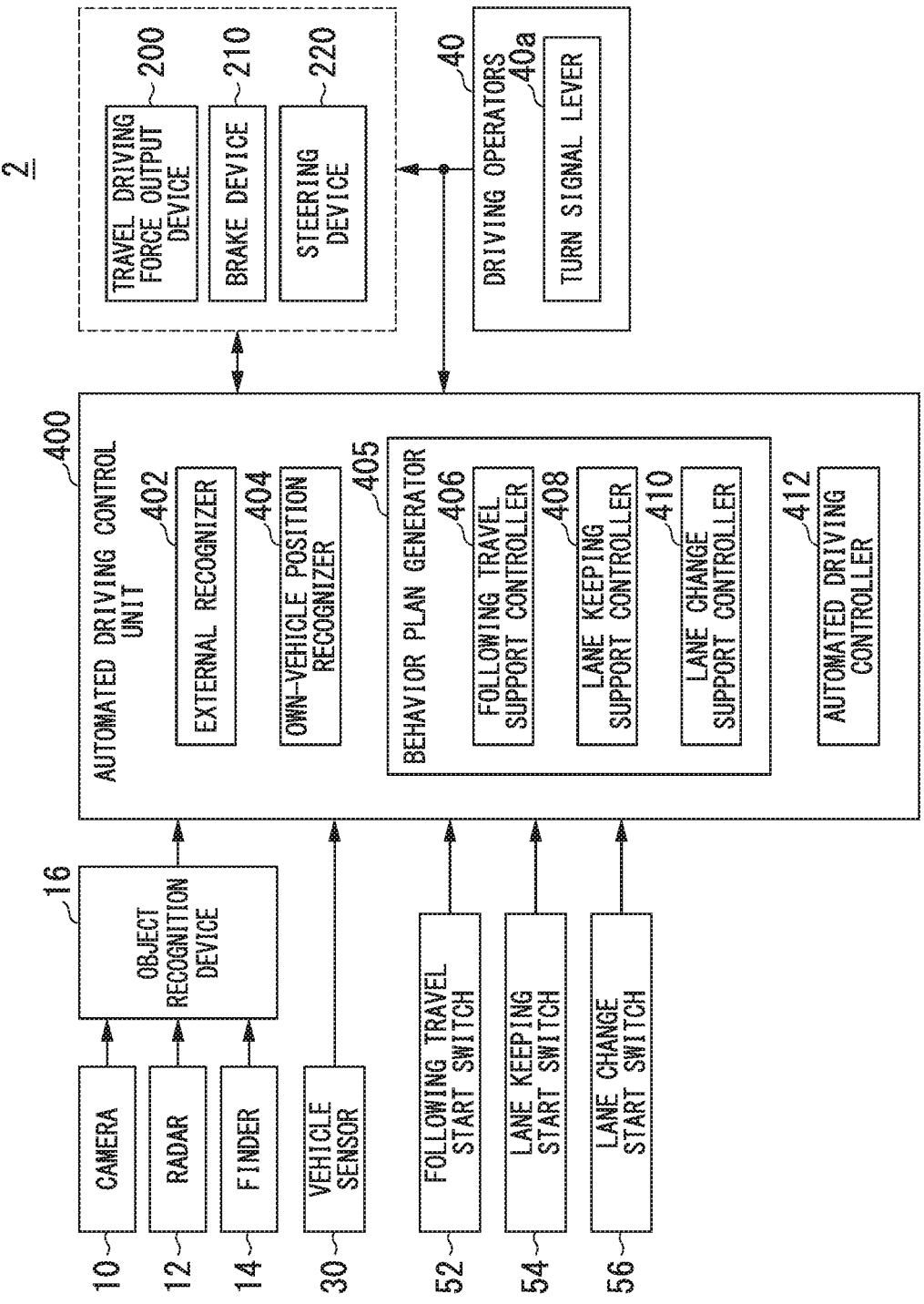
FIG. 13 is a diagram showing an exemplary configuration in which a vehicle control system is applied to an automated driving vehicle.

The vehicle control system of the above embodiments may be incorporated into an automated driving vehicle 2. FIG. 13 is a diagram showing an exemplary configuration in which the vehicle control system is applied to the automated driving vehicle 2. In the following description, the same names are used for the same components as those described above and redundant explanations will be omitted as appropriate. An automated driving control unit 400 in the automated driving vehicle 2 is a replacement of the driving support control unit 100.

The components of a following travel support controller 406, a lane keeping support controller 408, and a lane change support controller 410 are incorporated into a behavior plan generator 405. The automated driving control unit 400 is connected to a navigation device 60. The navigation device 60 outputs a route to the destination to the behavior plan generator 405. The behavior plan generator 405 refers to a more detailed map than map data of the navigation device 60 to determine a recommended lane in which the vehicle is to travel and outputs the recommended lane to an automated driving controller 412.

On the basis of information recognized by an external environment recognizer 402, the automated driving controller 412 controls some or all of a travel driving force output device 200 including an engine and a motor, a brake device 210, and a steering device 220 such that the own-vehicle M travels in the recommended lane input from the behavior plan generator 405.

In such an automated driving vehicle 2, a situation may occur in which lane change is performed on the basis of an instruction from an occupant or automatically according to a traveling condition of the own-vehicle M. The automated driving vehicle 2 can automatically perform lane change through the processing of the automated driving control unit 400.

Figure 14:
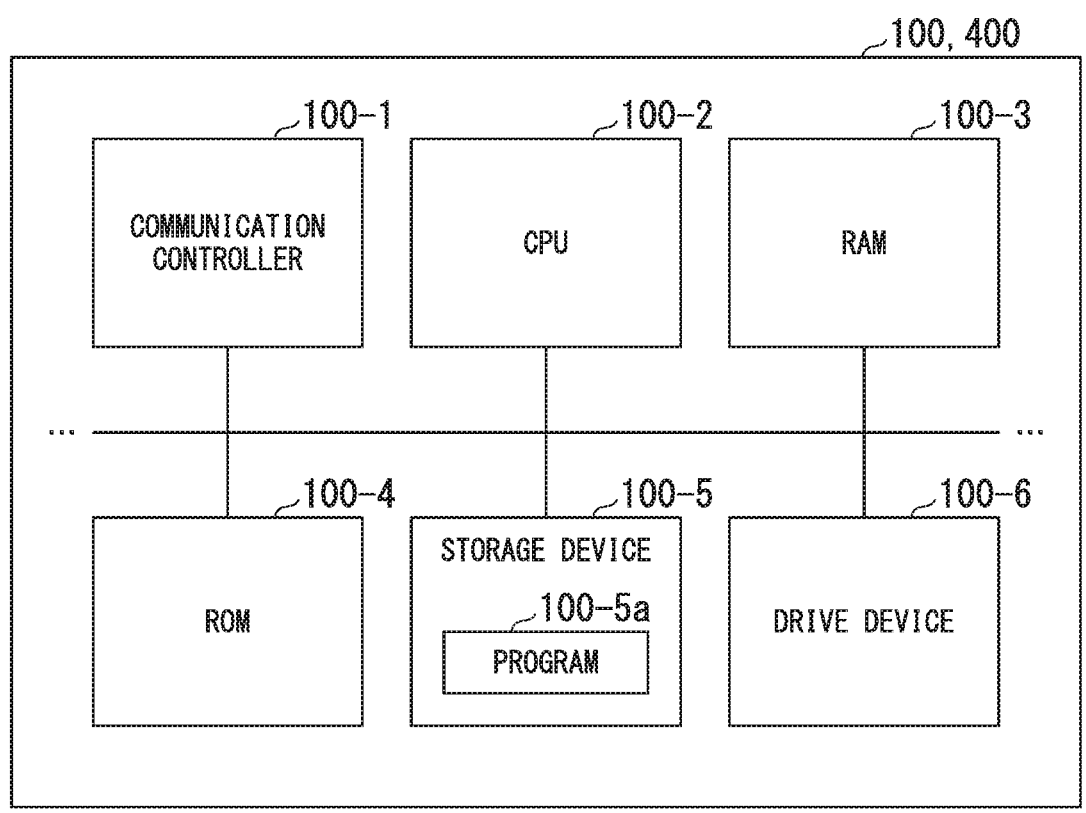
FIG. 14 shows a plurality of configurations that can be used in a driving support control unit or an automated driving control unit.

The embodiments described above can be expressed as follows. FIG. 14 is a diagram showing a plurality of components that can be used in the driving support control unit 100 or the automated driving control unit 400. The driving support control unit 100 is configured such that a communication controller 100-1, a CPU 100-2, a RAM 100-3 used as a working memory, a ROM 100-4 storing a boot program or the like, a storage device 100-5 such as a flash memory or a HDD, a drive device 100-6, or the like are connected to each other via an internal bus or a dedicated communication line.

The communication controller 100-1 performs communication with components other than those of the driving support control unit 100 shown in FIG. 1 or 7 and the automated driving control unit 400 shown in FIG. 13. The storage device 100-5 stores a program 100-5a to be executed by the CPU 100-2. This program is loaded in the RAM 100-3 by a direct memory access (DMA) controller (not shown) or the like and then executed by the CPU 100-2. Thereby, some or all of the own-vehicle position recognizer 104, the following travel support controller 106, the lane keeping support controller 108, the lane change support controller 110, the own-vehicle position recognizer 404, the following travel support controller 406, the lane keeping support controller 408, and the lane change support controller 410 are realized.

The embodiments described above can also be expressed as follows.

A vehicle control system includes a hardware processor and a storage device storing a program causing the hardware processor to execute first steering control for controlling a steering device such that a traveling lane is maintained and to execute second steering control that is activated during execution of the first steering control, wherein if a command value given to the steering device in the first steering control has continued to deviate either left or right in a case that the second steering control starts, the second steering control is executed by reflecting the command value given in the first steering control.

Although the modes for carrying out the present invention have been described above by way of embodiments, the present invention is not limited to these embodiments at all and various modifications and substitutions can be made without departing from the gist of the present invention.

For example, the second steering control may be, for example, steering control that is performed to avoid an object on a lane recognized by the object recognition device 16, in addition to lane change control.

The above embodiments have been exemplified by the vehicle control system 1 that can perform lane change with a stable behavior against disturbances such as crosswind or cant. However, the present invention can also be applied to other cases such as where the vehicle is out of alignment or where a correction value for midpoint calibration of the steering device 220 has deviated.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
a processor that executes instructions to:
execute-first steering-control instructions for controlling a steering device such that a traveling lane is maintained; and
execute second steering control instructions that are activated during execution of the first steering control instructions,
wherein, if a command value given to the steering device by the first steering control instructions has continued to deviate either left or right in response to the second steering control instructions having been initiated, the second steering control instructions are executed using the command value, and
wherein the second steering control instructions comprise calculating a correction command value based on the command value and adding or subtracting the correction command value to or from the command value.

2. The vehicle control system according to claim 1, wherein the second steering control instructions further comprise calculating the correction command value based on the command value in response to determining that traveling in a straight lane from among command values supplied in the first steering control instructions excluding elements due to a curved road or a steering operation of an occupant.

3. The vehicle control system according to claim 1, wherein the second steering control instructions further comprise setting a first target position at which the second steering control instructions end and setting a second target position at which the second steering control instructions end to a position far from the first target position in in response to determining that the calculated correction command value is equal to or greater than a predetermined threshold value.

4. The vehicle control system according to claim 1, wherein the second steering control instructions further comprise performing a lane change of a vehicle.

5. A vehicle control method performed by a computer mounted in a vehicle, the vehicle control method comprising:
the computer executing first steering control instructions for controlling a steering device such that a traveling lane is maintained; and
executing second steering control instructions that are activated during execution of the first steering control instructions, wherein if a command value given to the steering device by the first steering control instructions has continued to deviate either left or right in in response to the second steering control instructions having been initiated, the second steering control instructions are executed using the command value, and wherein the second steering control instructions comprise calculating a correction command value based on the command value and adding or subtracting the correction command value to or from the command value.

6. A computer-readable non-transitory storage medium storing a program causing a computer to:

execute first steering control instructions for controlling a steering device such that a traveling lane is maintained; and execute second steering control instructions that are activated during execution of the first steering control instructions, wherein if a command value given to the steering device by the first steering control instructions has continued to deviate either left or right in response to the second steering control instructions having been initiated, the second steering control instructions are executed using the command value, and wherein the second control instructions comprise calculating a correction command value based on the command value and adding or subtracting the correction command value to or from the command value.

* * * * *